Patented Nov. 8, 1927.

1,648,184

UNITED STATES PATENT OFFICE.

EMIL KLINE, OF HUDSON, NEW YORK, ASSIGNOR, BY MESNE ASSIGNMENTS, TO THE GRASSELLI CHEMICAL COMPANY, OF CLEVELAND, OHIO, A CORPORATION OF OHIO.

PROCESS FOR THE PREPARATION OF SUBSTITUTED GUANIDINES.

No Drawing.    Application filed October 6, 1924. Serial No. 742,070.

This invention relates to a process for the preparation of substituted guanidines.

Diphenylguanidine has been prepared (see Hoffman, Ber., 2, 460) by desulfurizing thio carbanilide with lead oxid in a solution of alcoholic ammonia at or near the boiling point of the solution. In United States Patent No. 1,446,818 there is described a method for the production of diarylguanidines, particularly diphenylguanidine, by subjecting alcoholic ammoniacal solutions of diarylthioureas, specifically thio carbanilide, to the action of lead oxid at a temperature not greater than 60° C. In United States Patent No. 1,437,419 there is described a similar method, using lead oxid as the desulfurizing agent, for the preparation of trisubstituted guanidines, specifically the tri toluyl guanidine.

Alway and Vail (see Am. Chem. J. 28, 158,—1904—) have shown by their work on the preparation of aromatic guanidines other than diphenylguanidine that freshly precipitated lead hydroxide in the form of a thin paste in alcohol is a better desulfurizing agent than lead oxid. The use of freshly precipitated lead hydroxid as the desulfurizing agent, however, is not well adapted to commercial operation due to the difficulty and inconvenience involved in the maintenance of a supply thereof.

I have now found that substituted guanidines can be produced by desulfurizing substituted thio-ureas in solution by the use instead of lead oxid or hydroxid as in the prior processes referred to, of a substantially water-soluble salt of a heavy metal such as lead nitrate, chloride acetate, etc., ferric sulfate, copper chloride, etc. which salts liberate a metallic oxid or hydroxid capable of accomplishing the desulfurization in an alkaline medium and in presence of ammonia or an amine, such as aniline, toluidine, xylidine, etc.; for convenience, ammonia and the amines will be referred to hereinafter as nitrogenous bases.

By the use of the expression "a substantially water-soluble salt of a heavy metal" and the expression "a substantially water-soluble lead salt" I intend, for the purposes of the present invention, to exclude those salts of heavy metals and lead salts respectively which have a water solubility less than about 0.5 part per 100 parts of cold water.

The process is particularly designed for the production of diphenylguanidine and will be illustrated in the following example in connection therewith, it being understood however that the invention is not limited to the specific materials and proportions thereof and details of procedure and conditions described:

*Example.*

228 pounds of thiocarbanilid, 800 pounds (130 gallons) of 60% by weight denatured alcohol and 157.2 pounds of aqua ammonia (28–29% $NH_3$) are placed in a suitable kettle equipped with an agitator and a condenser. The temperature of the mixture is gradually raised to about 45° C. in about 15 minutes and then 380 pounds of finely powdered lead nitrate gradually added over a period of one to one and one-half hours, the temperature being held at 45° C. After all of the lead nitrate has been added, the temperature is gradually raised in the course of 30 to 45 minutes to 70–75° C. and held at this temperature for one to one and one-half hours or until the desulfurization is complete. The mixture is agitated throughout the treatment. The diphenylguanidine is then recovered from the reaction mixture for instance as follows: The mixture is filtered and the solid residue consisting principally of lead sulfid is washed first with 60% alcohol at 50–60° C. and then with cold water. The combined filtrate and washings is diluted with water and heated to boiling temperature and stirred for 1–2 hours. This dissolves the diphenylguanidine nitrate and leaves the gummy carbodiphenylimide formed as a by-product of the reaction and impurities undissolved. The solution is then filtered and treated with an excess of 30% caustic soda solution with stirring until the precipitation of the diphenylguanidine is complete. The diphenylguanidine is then separated by filtration, washed with water and dried at about 60° C.

The lead nitrate and the alcohol used in the process may be recovered for re-use in the process in any suitable manner as will be obvious to one skilled in this art.

The specific procedure described in the foregoing example may be considerably varied. The lead nitrate may be supplied either as a finely divided solid as described or in the form of a solution and may be substituted by any salt which forms a hydroxid in the presence of ammonia having a sufficient affinity for sulfur to accomplish the desulfurization. The temperatures and times of treatment as well as the concentrations of the solutions involved may be varied. It is noted, however, that the temperatures which may be employed are relatively low, that the desulfurization takes place rapidly and more completely in less time than when lead oxid is used as the desulfurizing agent, that less lead and less alcohol are required, and that good yields are obtained, the product being free from resinous or tar-like impurities. In the example ammonia is 12% in excess of the quantity required to react with all of the lead nitrate. This quantity may be incre sed. The quantity of lead nitrate also may be varied. A quantity 15% in excess of that theoretically required to accomplish the desulfurization gives satisfactory results Diphenylguanidine prepared in accordance with the example is completely soluble in dilute hydrochloric acid solution and melts at 145–147° C.

For the preparation of other diarylguanidines the thiocarbanilide of the foregoing example is replaced by other disubstituted thioureas and for the preparation of the tri aryl guanidines the ammonia of the example is replaced by the corresponding aryl amine such as aniline, toludin, etc. Or in other words, my invention consists generally in substituting a metallic salt for the metallic oxid used as the desulfurizing agent in prior processes for the preparation of di and tri aryl guanidines such as those referred to.

I claim:—

1. In processes for the preparation of substituted guanidines involving the addition of a desulfurizing agent to an alcoholic ammoniacal solution of a substituted thiourea and heating the resulting mixture, the use as desulfurizing agent of a substantially water-soluble lead salt.

2. In processes for the preparation of substituted guanidines involving the addition of a desulfurizing agent to an alcoholic ammoniacal solution of a substituted thiourea and heating the resulting mixture, the use as desulfurizing agent of lead nitrate.

3. Process for the preparation of diarylguanidines which comprises adding to an alcoholic ammoniacal solution of a diarylthiourea a substantially water-soluble lead salt and heating the resulting mixture.

4. Process for the preparation of diarylguanidines which comprises adding lead nitrate to an alcoholic ammoniacal solution of a diarylthiourea and heating the resulting mixture.

5. Process for the preparation of diphenylguanidine which comprises adding to an alcoholic ammoniacal solution of thiocarbanilide a substantially water-soluble lead salt and heating the resulting mixture.

6. Process for the preparation of diphenylguanidine which comprises adding lead nitrate to an alcoholic ammoniacal solution of thiocarbanilide and heating the resulting mixture.

In testimony whereof, I affix my signature.

EMIL KLINE.